No. 630,306.  
C. R. MURRAY.  
EQUALIZER.  
(Application filed Mar. 23, 1898.)  
(No Model.)
Patented Aug. 1, 1899.
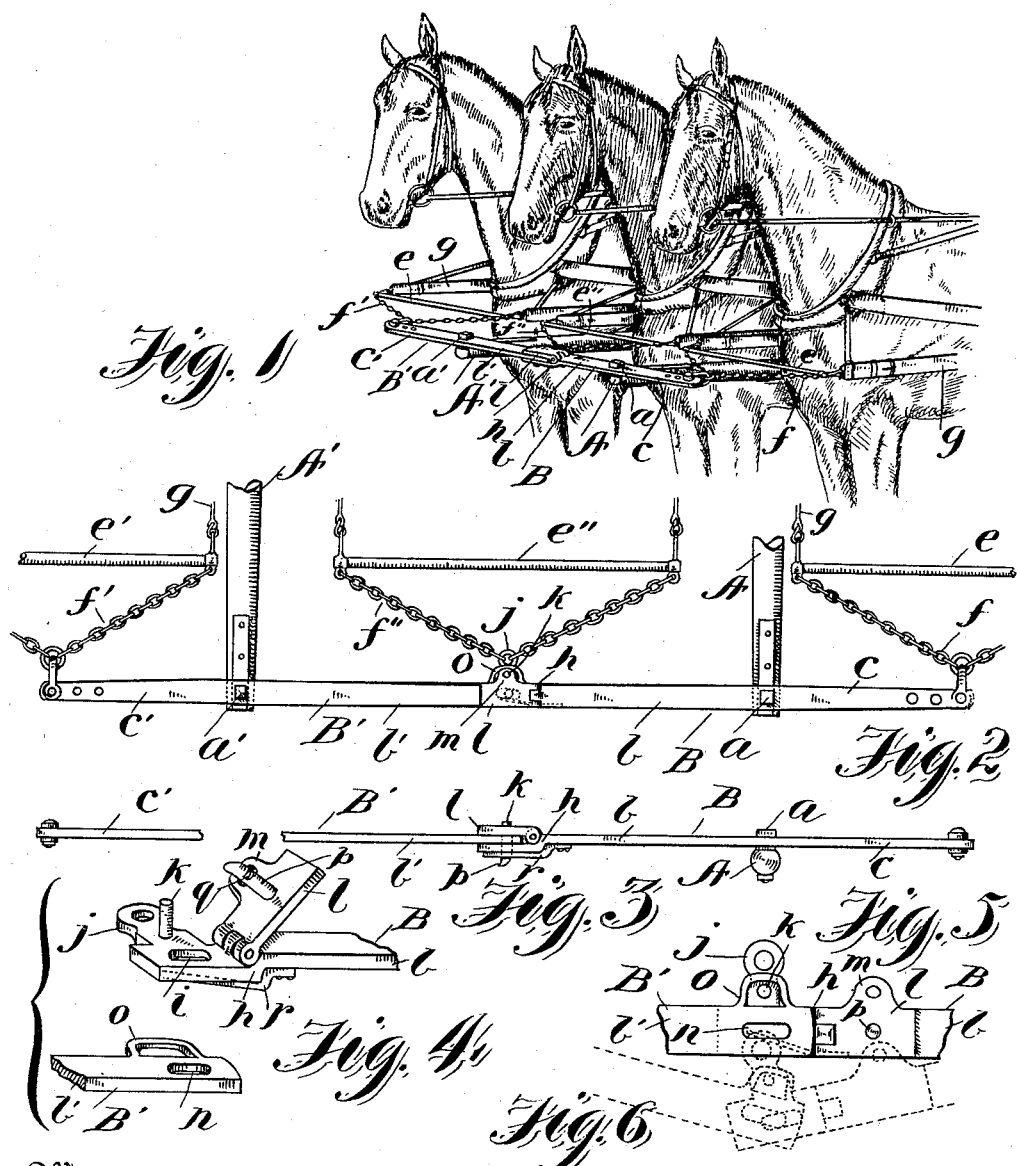

UNITED STATES PATENT OFFICE.

CHARLES RAUSFORD MURRAY, OF SAN FRANCISCO, CALIFORNIA.

EQUALIZER.

SPECIFICATION forming part of Letters Patent No. 630,306, dated August 1, 1899.

Application filed March 23, 1898. Serial No. 674,903. (No model.)

*To all whom it may concern:*

Be it known that I, CHARLES RAUSFORD MURRAY, a citizen of the United States, residing at San Francisco, in the county of San Francisco and State of California, have invented certain new and useful Improvements in Equalizers; and I do hereby declare the following to be a full, clear, and exact description of the invention, such as will enable others skilled in the art to which it appertains to make and use the same.

My present invention relates in a general way to that class of devices known in the art as "equalizers," and more particularly to the "holdback" variety, which are in contradistinction to what is generally understood by equalizers—namely, draft-equalizers. Not only with the thought of bunching the animals and bringing them nearer the vehicle, and consequently under better control, are the members of a team consisting of more than two now hitched abreast, but to utilize the strength of each and every horse in successfully holding back, as well as drawing, the conveyance. In the ordinary manner of hitching where the wheel-team is preceded by a leader or leaders the entire work of holding back was thrown on the former by reason of the manner of connecting them to the pole either by means of the collar and forward leading-chains or directly to the breeching by the ordinary holdback-straps. In this method the leaders, connected as they are to the lead-bars simply by flexible traces, are left idle, while on their comrades the entire work of holding back is thrown. This three or four abreast manner of assembling the team has for years been the successful custom of Russia, where the "troika," with its characteristic yoked team, is typical of the country. Now realizing the unequal conditions thrown about the central horse of the group relative to his adjacent companions, which must necessarily hinder him in as free easy unconfined action, I have constructed the subject of this application, whose employment automatically equalizes the work of each horse, and thereby not only renders the vehicle or rolling apparatus better controlled, but apportions out the relative work each horse is required to accomplish and indicates any lapse in his endeavors.

In heavy fire apparatus this equalizer is especially applicable and is at present in practical operation on this class of machines.

In the matter of structural simplicity, compactness, strength, and economy I have not lost sight of, and in following the accompanying specification other objects and advantages of the invention may be observed by those familiar with this class of devices.

In the accompanying drawings I have endeavored to clearly illustrate the equalizer, and in the several views shown like letters of reference indicate like parts, and in which—

Figure 1 is a perspective view of the device, showing its position relative to the team. Fig. 2 is a top view of the invention. Fig. 3 is a view taken at right angles to Fig. 2. Fig. 4 is a perspective view of the central locking mechanism. Fig. 5 is a top view of the locking mechanism, Fig. 6 in dotted lines representing a limit of its play.

Referring now to the above views by letter, A A' represent the ordinary double parallel poles used universally where teams are hitched in the manner set forth above. Between the poles is positioned the central animal of the group, while on the opposite sides of the poles are placed the side animals. By this distribution it will be seen that each animal is separated from its companion by a pole.

Pivoted to the extremities of the poles A A' at the points $a$ $a'$ are the levers B B', which are normally at right angles to the poles and whose inner ends are secured together in a novel manner hereinafter set forth. The length of the portions of the levers B B' between the poles and which I will designate $b$ $b'$, respectively, is greater than the outer extremities $c$ $c'$, the practical proportion being aboxt eleven and one-half to sixteen. To the outer extremities of these arms $c$ $c'$ are attached the ordinary clevises $d$ $d'$, which are connected to the short bars $e$ $e'$ by means of the diverging chains $f f'$, while leading from ordinary snap-hooks at the extremities of these bars are holdback-straps $g$, which unite rearwardly with the breeching of the harness.

I will now explain the construction of the central connection referred to above.

The inner extremity of the arm $b$ is slightly offset at $h$ and is formed with the oblong perforation $i$, while the integrally-formed projection $j$ is connected terminally with the central diverging chains $f''$, which lead to the bar $e''$, the latter being connected to the central horse in the manner above described. Projecting upward from the projection $j$ is the rigid pin $k$, while hinged to the arm $b$ is the locking member $l$, which is formed with the perforated projection $m$, the latter engaging with the pin $k$ as the member $l$ swings over into the position shown in Figs. 2 and 3. The inner extremity of the arm $b'$ is adapted to rest on the offset $h$, with the perforation $n$ coinciding with perforation $i$, while the oblong perforated projection $o$ engages with the pin $k$. Projecting from this hinged member $l$ and adapted to protrude through the perforations $n$ and $i$ is the locking-pin $p$, in which is cut the terminal notch or groove $q$, the latter engaging with the spring $r$, which is riveted to the arm $b$.

By reference to Figs. 5 and 6 it is manifest that as the levers B B' swing in either direction the pin $k$ coming in contact with the extremity of the perforated projection $m$ prevents further motion in that direction.

All the driver is required to do is to keep the levers B B' in a relative straight line, as shown in Fig. 2, and in so doing each member of the team is held down to his work. Should any one horse fail to exert himself, the levers would immediately indicate his action by swinging either outward or inward, as the case may be.

In detaching the levers B B' the hinged member $l$ is swung upward into the position shown in Fig. 4 and the lever B removed from engagement with the pin $k$.

The plurality of perforations in the outer extremities of the levers B B' are for the purpose of adjusting the relative lengths of the arms.

The usual manner of hitching the team where the animals are assembled as shown is to connect the collar of the central horse directly with the extremity of each pole by a holdback-chain, while from the collars of the side horses a chain leads to a rigid right-angular extension of the pole. In this method the animals are required to combat with a rigid non-yielding force, and even if all the members of the team are acting in unison and non-lagging a large amount of the horse's strength is consumed in keeping his feet or directing his efforts, which necessarily diverts power from the object to be attained. This objection is entirely obviated by the use of my equalizer, as is evident to those familiar with this class of devices.

I am aware that changes in the form and proportion of parts of the devices herein shown and described as an embodiment of my invention can be made without departing from the spirit or sacrificing the advantages thereof, and I therefore reserve the right to make such changes and alterations as fairly fall within the scope of my invention.

What I claim is—

1. In a device of the class described the combination with a plurality of vehicle-poles, a plurality of levers pivoted to said poles, the inner extremities of said levers being connected together in such a manner as to permit of the swinging of said levers for the purpose set forth.

2. In a device of the class described the combination with a plurality of vehicle-poles, a plurality of levers pivoted to said poles, the inner extremities of said levers being detachably connected together for the purpose set forth.

3. A device of the class described consisting of a plurality of vehicle-poles, a plurality of pivoted levers, the inner extremities of said levers being connected together and means for limiting the play of said levers substantially for the purpose set forth.

In testimony whereof I affix my signature in presence of two witnesses.

CHARLES RAUSFORD MURRAY.

Witnesses:
BARTLETT F. JONES,
STEPHEN D. RUSSELL.